United States Patent
Liu et al.

(10) Patent No.: US 11,143,869 B2
(45) Date of Patent: Oct. 12, 2021

(54) EYE TRACKING DEVICE AND HEAD-MOUNTED DISPLAY DEVICE

(71) Applicant: BEIJING 7INVENSUN TECHNOLOGY CO., LTD., Beijing (CN)

(72) Inventors: Jinxing Liu, Beijing (CN); Tongbing Huang, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 123 days.

(21) Appl. No.: 16/347,580

(22) PCT Filed: Mar. 28, 2018

(86) PCT No.: PCT/CN2018/080811
§ 371 (c)(1),
(2) Date: May 5, 2019

(87) PCT Pub. No.: WO2018/177311
PCT Pub. Date: Oct. 4, 2018

(65) Prior Publication Data
US 2020/0012105 A1    Jan. 9, 2020

(30) Foreign Application Priority Data
Mar. 31, 2017    (CN) .......................... 201710208503.1

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G06F 3/013* (2013.01);
(Continued)

(58) Field of Classification Search
CPC . G02B 27/0172; G02B 27/0093; G06F 3/013; G06K 9/00604; H04N 5/33; H04N 5/2351
(Continued)

(56) References Cited

U.S. PATENT DOCUMENTS 7,130,453 B2 * 10/2006 Kondo ............... G06K 9/00604
382/117
7,986,816 B1    7/2011 Hoanca et al.
(Continued)

FOREIGN PATENT DOCUMENTS

CN    202563433 U    11/2012
CN    105608436 A    5/2016
(Continued)

OTHER PUBLICATIONS

CA first examination report dated May 29, 2020 re: Application No. 3,042,617, pp. 1-5.
(Continued)

*Primary Examiner* — Marin Pichler
*Assistant Examiner* — Mitchell T Oestreich
(74) *Attorney, Agent, or Firm* — Gang Yu

(57) ABSTRACT

An eye tracking device and a head-mounted display device are provided. The eye tracking device includes at least one infrared camera, at least one infrared light, group and a control circuit. The control circuit is electrically connected with the at least one infrared light group. Each of the at least one infrared light group includes at least two infrared lights which are arranged at different locations. Each of the at least one infrared camera is configured to collect an eye image of a user when the at least two infrared lights are turned on. The control circuit is configured to respectively control the number of infrared lights achieving effective operating brightness in each infrared light group when the eye tracking (Continued)

device performs iris recognition and eye tracking, and the effective operating brightness refers that a brightness is not less than a threshold brightness.

13 Claims, 2 Drawing Sheets

(51) Int. Cl.
  *G06F 3/01* (2006.01)
  *G06K 9/00* (2006.01)
  *H04N 5/235* (2006.01)
  *H04N 5/33* (2006.01)

(52) U.S. Cl.
  CPC ....... *G06K 9/00604* (2013.01); *H04N 5/2351* (2013.01); *H04N 5/33* (2013.01)

(58) Field of Classification Search
  USPC ........................................................ 359/630
  See application file for complete search history.

(56) References Cited

U.S. PATENT DOCUMENTS 9,430,040 B2    8/2016   Zhang et al.
2015/0205348 A1    7/2015   Nortrup et al.
2015/0310253 A1    10/2015   Agrawal et al.
2016/0180801 A1    6/2016   Lee et al.
2016/0195927 A1    7/2016   Lopez
2016/0363995 A1*   12/2016   Rougeaux ............ G02B 27/017

FOREIGN PATENT DOCUMENTS

CN      106874895 A    6/2017
CN      206594689 U    10/2017
EP      3035656 A1     6/2016
JP      H04347133 A    12/1992
WO      2016158000 A1  10/2016

OTHER PUBLICATIONS

JP first examination report dated Aug. 17, 2020 re: Application No. 2019-527512, pp. 1-3.
EP search report dated May 26, 2020 re: Application No. 18776251.3, pp. 1-8.
AU first examination report dated Apr. 29, 2020 re: Application No. 2018243092, pp. 1-6.

* cited by examiner

EYE TRACKING DEVICE AND HEAD-MOUNTED DISPLAY DEVICE

TECHNICAL FIELD

The present disclosure relates to the technical field of electronic devices, and in particular to an eye tracking device and a head-mounted display device.

BACKGROUND

An existing eye tracking device may have functions of eye tracking and iris recognition, so that the eye tracking device may acquire a direction of line-of-sight of a user and accurately perform user identify.

During research, an inventor found that a camera is adopted to capture an eye image of an eye area under the condition that an infrared supplement light supplements lights when implementing an eye tracking function and an iris recognition function in related art. And a location of a gaze point and user identity information are determined according to different image recognition algorithms. In these two processes, the number of infrared lights that achieve effective operating brightness may not be changed. That is, the number of the infrared lights that achieve the effective operating brightness when performing the iris recognition function by the infrared lights brings into correspondence with the number of the infrared lights that achieve the effective operating brightness when performing the eye tracking function by the infrared lights. Thus, when there are many infrared lights that achieve the effective operating brightness, eye characteristics may not be acquired completely since part of an iris image is hidden due to many infrared light spots on an eye image collected by an infrared camera when the eye tracking device performs the iris recognition function. Or a direction of line of sight may not be calculated accurately and may not be calculated since no infrared light spot is collected possibly in an iris area due to few infrared light spots on the eye image collected by the infrared camera when there are fewer infrared lights and the eye tracking device performs the eye tracking function.

SUMMARY

At least some embodiments of present disclosure provide an eye tracking device and a head-mounted display device, so as to avoid interference of too many infrared lights to collection of eye characteristics by reducing the number of infrared lights that achieve effective operating brightness in an infrared light group when the eye tracking device performs iris recognition function, and make eye tracking more accurate by increasing the number of the infrared lights that achieve the effective operating brightness when the eye tracking device performs light-of-sight tracking function.

In an embodiment of the present disclosure, an eye tracking device is provided, including: at least one infrared camera, at least one infrared light group and a control circuit; and the control circuit is electrically connected with the at least one infrared light group, each of the at least one infrared light group includes at least two infrared lights which are arranged at different locations; each of the at least one infrared camera is configured to collect an eye image of a user when the at least two infrared lights are turned on; the control circuit is configured to respectively control the number of infrared lights that achieve effective operating brightness in each infrared light group when the eye tracking device performs iris recognition and eye tracking, and the effective operating brightness refers that a brightness is not less than a threshold brightness.

In an optional embodiment, the at least one infrared light group includes an infrared light group which is arranged at a first location and an infrared light group which is arranged at a second location, infrared light which is emitted when the infrared light group arranged at the first location works may not directly irradiate an eye of the user, and infrared light which is emitted when the infrared light group arranged at the second location works may directly irradiate the eye of the user; and the control circuit is configured to control the infrared light group which is arranged at the first location to achieve the effective operating brightness when the eye tracking device performs the iris recognition, and control the infrared light group which is arranged at the second location to achieve the effective operating brightness when the eye tracking device performs the eye tracking.

In an optional embodiment, each of the at least one infrared camera is electrically connected with the control circuit; each of the at least one infrared camera is further configured to transmit the eye image and an iris image which is formed when infrared light irradiates this infrared camera to the control circuit; and the control circuit is further configured to adjust the brightness of the infrared lights that achieves the effective operating brightness, so as to make a gray value of the eye image achieve a preset gray value.

In an optional embodiment, each infrared light group includes at least one first infrared light and at least one second infrared light, and the number of the at least one first infrared light is less than the number of the at least one second infrared light; the control circuit is further configured to control the at least one first infrared light to achieve the effective operating brightness and control the brightness of the at least one second infrared light to be less than the threshold brightness when the eye tracking device performs the iris recognition, and further configured to control the brightness of the at least one first infrared light to be less than the threshold brightness and control the at least one second infrared light to achieve the effective operating brightness when the eye tracking device performs the eye tracking.

In an optional embodiment, the control circuit is electrically connected with each infrared light of the at least one infrared light group respectively; the control circuit is further configured to control infrared lights with a first set number to achieve the effective operating brightness when the eye tracking device performs the iris recognition; and control infrared lights with a second set number to achieve the effective operating brightness when the eye tracking device performs the eye tracking, and the first set number is less than the second set number.

In an optional embodiment, the infrared light group at the first location includes at least two infrared lights, and the infrared light group at the second location includes at least three infrared lights; a light-emitting wavelength of each infrared light in the infrared light group at the first location is less than a light-emitting wavelength of any infrared light in the infrared light group at the second location.

In an optional embodiment, light-emitting wavelengths of at least two infrared lights in the infrared light group at the first location are different.

In an optional embodiment, the at least one infrared camera includes a first infrared camera and a second infrared camera, the control circuit is further configured to control the first infrared camera to work when the eye tracking device performs the iris recognition; and control the second infrared camera to work when the eye tracking device performs the eye tracking.

In an optional embodiment, the control circuit is further configured to control the at least one infrared camera to start working when the infrared lights achieve the effective operating brightness.

In another embodiment of the present disclosure, a head-mounted display device is provided. The head-mounted display device includes the eye tracking device in any one of above-mentioned embodiments.

Through the eye tracking device and the head-mounted display device according to the embodiments of the present disclosure, compared with the eye tracking device in the related art, each of the at least one infrared light group includes at least two infrared lights which are arranged at different locations. The control circuit may respectively control the number of the infrared lights that achieve the effective operating brightness in each infrared light group when the eye tracking device performs the iris recognition and the eye tracking, so that the number of infrared lights that achieve the effective operating brightness are different when the eye tracking device works under two different states, and accordingly the eye tracking device may respectively control the number of the infrared lights that achieve the effective operating brightness in each infrared light group when performing the iris recognition and the eye tracking. Thus, fewer number of the infrared lights achieve the effective operating brightness when the eye tracking device performs iris recognition and fewer infrared light spots appear on the user's eye image collected by the at least one infrared camera, and accordingly the user identity may be realized by acquiring all eye characteristics. Furthermore, many infrared lights are made to achieve the effective operating brightness when the eye tracking device performs the eye tracking, and many infrared light spots are made to appear on the user's eye image collected by the at least one infrared camera, and accordingly the direction of the line-of-sight of the user may be acquired more accurately.

In order to make the above-mentioned objectives, characteristics and advantages of the present disclosure more obvious and easier to understand, optional embodiments will be specially taken to describe the present disclosure below in detail in combination with drawings.

BRIEF DESCRIPTION OF THE DRAWINGS

In order to describe the technical solutions of the embodiments of the present disclosure more clearly, drawings required in the embodiments will be briefly introduced below. It is to be understood that the drawings below show some embodiments of the present disclosure, therefore these drawings should not be deemed to limit the scope. Those of ordinary skill in the art may further acquire other relevant drawings in accordance with these drawings without creative work.

Figure 1:
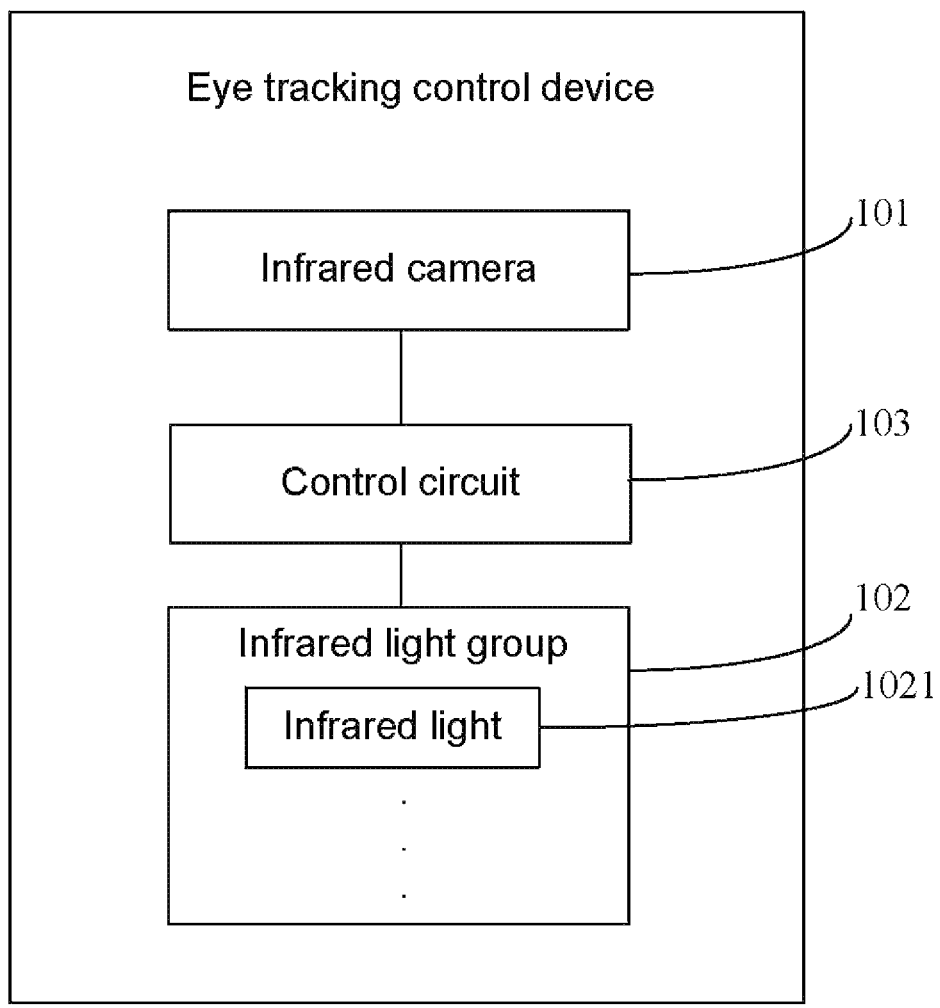
FIG. 1 shows a structural schematic diagram of an eye tracking device according to an embodiment of the present disclosure.

Number: 101—infrared camera, 102—infrared light group, 103—control circuit, 1021—infrared light, 400—ring-shaped infrared light panel, 401—glasses frame, 402—lens.

DETAILED DESCRIPTION

In order to make objectives, technical solutions and advantages of embodiments of the present disclosure clearer, technical solutions in embodiments of the present disclosure will be clearly and completely described below in combination with drawings in the embodiments of the present disclosure. It is apparent that the described embodiments are not all embodiments but part of the embodiments of the present disclosure. Components of the embodiments of the present disclosure described and shown in the drawings here may be arranged and designed in accordance with different allocations generally. Therefore, the detailed description of the embodiments of the present disclosure provided in the drawings below is not intended to limit the scope of the present disclosure requiring for protection, but show the selected embodiments of the present disclosure. All other embodiments obtained by those skilled in the art on the basis of the embodiments in the present disclosure without creative work shall fall within the scope of protection of the present disclosure.

Embodiment One

The embodiment one of the present disclosure provides an eye tracking device. As shown in FIG. 1, the eye tracking device includes an infrared camera 101, and further includes an infrared light group 102 and a control circuit 103. The control circuit 103 is electrically connected with the infrared light group 102. The infrared light group 102 includes at least two infrared lights 1021 which are arranged at different locations, and the infrared camera 101 may be electrically connected with the control circuit 103.

The infrared camera 101 is configured to collect an eye image of a user when the at least two infrared lights 1021 are turned on.

When the eye tracking device works, and the environment where the eye tracking device is located is dark, the infrared camera 101 may collect the eye image of the user when the at least two infrared lights 1021 are turned on.

The control circuit 103 is configured to respectively control the number of the at least two infrared lights 1021 that achieve effective operating brightness in the infrared light group 102 when the eye tracking device performs iris recognition and eye tracking, and the effective operating brightness refers that the brightness is not less than a threshold brightness.

The at least two infrared lights 1021 that achieve effective operating brightness refers that when the infrared lights having the brightness directly irradiates an eye of the user and when the infrared camera 101 collects the eye image of the user, at least one infrared light spot collected in an iris area may cover a local part of an iris image and accordingly eye characteristics may not be extracted completely. If one part of the at least two infrared lights 1021 are very dark, and when this part of the at least two infrared lights 1021 irradiate the eyes of the user, the iris image in the eye image extracted by the infrared camera may not be locally covered, and extraction of all eye characteristics may not be influenced, so that this part of the at least two infrared lights 1021 do not achieve the effective operating brightness. In order to facilitate convenient narration, at least one infrared light spot formed by irradiation of one part of the at least two infrared lights 1021 that achieve the effective operating brightness is called to include the at least one infrared light spot, and at least one infrared light spot formed when another part of the at least two infrared lights 1021 that do not achieve the effective operating brightness irradiate the eye image is called not to be formed since this at least one infrared light spot does not generate interference when collecting eye characteristic values and does not play part in calculation of a direction of line-of-sight when tracking line of sight.

The threshold brightness may be acquired through multiple tests. When at least one infrared light with the brightness less than the threshold brightness irradiates the eyes of the user, the at least one infrared light spot which is formed on the iris image in the eye image acquired by the infrared camera has very low brightness, or the at least one infrared light spot is very small and may not influence extraction of eye characteristic value of the user.

In an alternative mode of implementation, through the technical solution provided in the embodiment one of the present disclosure, at least one infrared light group includes a infrared light group which is arranged at a first location and a infrared light group which is arranged at a second location. The infrared light which is emitted when the infrared light group arranged at the first location works may not directly irradiate an eye of the user, and infrared light which is emitted when the infrared light group arranged at the second location works may directly irradiate the eye of the user.

The control circuit is further configured to control the infrared light group which is arranged at the first location to achieve the effective operating brightness when the eye tracking device performs the iris recognition, and control the infrared light group which is arranged at the second location to achieve the effective operating brightness when the eye tracking device performs the eye tracking.

The infrared light group arranged at the first location does not directly irradiate the eyes of the user during working refers that the infrared light group at this location may irradiate other places, such as an eyelid rather than directly irradiate a human eye when achieving the effective operating brightness. Further, through irradiating the human eye by diffuse reflection and implementing imaging on the infrared camera, the infrared camera acquires the eye image of the user and no infrared light spot occurs in the iris area of the eye image. While the infrared light group arranged at the second location may directly irradiate the eyes of the user during working and implement imaging on the infrared camera through specular reflection of the eye, so that the infrared camera acquires the eye image of the user and the at least one infrared light spot occurs in the iris area of the eye image.

For example, two ring-shaped light panels may be arranged, and a diameter of one of the two ring-shaped light panels is greater than a diameter of the other of the two ring-shaped light panels. A ring-shaped light panel having the greater diameter is sleeved on a ring-shaped light panel having the smaller diameter. The ring-shaped light panel having the greater diameter is arranged at a place which is far from the eyes of the user, and the emitted infrared light may irradiate an area around the eyes of the user rather than directly irradiate the eyes of the user. Through diffuse reflection of this area, part of diffuse reflection lights may irradiate the eyes of the user and be imaged on the infrared camera. In this way, the eye image acquired by the infrared camera has no infrared light spot.

In the mentioned circumstance, the infrared light group which is arranged at the first location includes at least two infrared lights, and the infrared light group which is arranged at the second location includes at least three infrared lights. Furthermore, a light-emitting wavelength of each infrared light in the infrared light group at the first location is less than a light-emitting wavelength of any infrared light in the infrared light group at the second location.

In order to improve iris recognition rate of the eye image of the user and facilitate extraction of the iris characteristic values, an infrared light with the wavelength of 760-850 nm is generally taken during the iris recognition. While in order to improve definition of the infrared light spot in the eye image and protect the eyes of the user, an infrared light with the wavelength of 850-940 nm is generally taken during the eye tracking.

Especially, the iris recognition rate may be influenced by the wavelength of the infrared light and a color of the iris area in each eye of the user during iris recognition, therefore in an alternative mode of implementation, through the technical solution provided in the embodiment one of the present disclosure, the light-emitting wavelengths of at least two infrared lights in the infrared light group arranged at the first location are different from each other. For example, if three infrared lights are included in the infrared light group arranged at the first location, the wavelengths of the infrared lights emitted by these three infrared lights are 770 nm, 810 nm and 840 nm, respectively. When one user uses the eye tracking device to perform the iris recognition, the infrared lights having these three wavelengths are enabled to work effectively. The clearest image, namely an image having a greatest gray value, is selected from three images which are respectively acquired by the infrared camera, and the infrared light which works corresponding to the clearest image is the one that is the most suitable for the user.

In an alternative mode of implementation, the embodiment one of the present disclosure proposes that the at least one infrared camera includes a first infrared camera and a second infrared camera. The control circuit is further configured to control the first infrared camera to work when the eye tracking device performs the iris recognition and control the second infrared camera to work when the eye tracking device performs the eye tracking. The wavelength of the infrared light received by the first infrared camera is less than the wavelength of the infrared light received by the second infrared camera.

The number of the infrared lights 1021 achieving the effective operating brightness in the infrared light group 102 when the eye tracking device performs the iris recognition is controlled to be different from the number of the infrared lights 1021 achieving the effective operating brightness in the infrared light group 102 when the eye tracking device performs the eye tracking. In this way, the user's eye image collected by the infrared camera 101 may not include the infrared light spot or may include fewer infrared light spots when the eye tracking device performs the iris recognition, thereby avoiding a circumstance that the iris recognition cannot be completed since the characteristic values of the eyes is not extracted completely due to too many infrared light spots on the eye image acquired by the infrared camera 101. Meanwhile, many infrared lights 1021 achieving the effective operating brightness irradiate a corneal area of each eye of the user when the eye tracking device performs the eye tracking. In this way many infrared light spots are distributed near a pupil center of each eye in the eye image acquired by the infrared camera 101, and the direction of the line-of-sight of the user may be confirmed more accurately by calculating a distance between the pupil center and each infrared light spot.

The eye tracking device may be configured as a virtual reality device or augmented reality device or a head-mounted eye-control device. The device may perform the iris recognition function to the user and confirm the direction of the line-of-sight of the user. The specific present disclosure environment shall not be defined here specifically.

The control circuit 103 includes a processor which may adjust the number of the infrared lights 121 achieving the effective operating brightness in the infrared light group 102 by outputting a pulse width modulation signal.

For example, when the infrared lights 1021 achieves the effective operating brightness, at least one minimum current passing through the infrared lights 1021 may be acquired by at least one early test, and at least one current may be adjusted by outputting at least one pulse width modulation signal. In this way the at least one current is greater than or equal to the minimum current.

During actual operation, when the brightness of the infrared light 1021 achieves the effective operating brightness and the iris image in the eye image or the infrared light spot in the iris image acquired by the infrared camera is not clear, the brightness of the infrared light 1021 may be adjusted to make the mentioned iris image and the infrared light spot clear.

In an alternative mode of implementation, the embodiment one of the present disclosure proposes that the infrared camera 101 is electrically connected with the control circuit 103, as shown in FIG. 1.

The infrared camera 101 is further configured to transmit the acquired eye image of the user to the control circuit 103.

The control circuit 103 is further configured to adjust the brightness of the infrared light 1021 achieving the effective operating brightness to make the gray value of the eye image achieve a preset gray value.

The circumstance includes that: when the eye tracking device performs the iris recognition, the control circuit 103 adjusts the gray value of a texture image in the eye image of the user to make texture clearer so as to increase recognition of the texture and accordingly facilitating rapid completion of the iris recognition. When the eye tracking device performs the eye tracking, the control circuit 103 adjusts a pupil in the acquired eye image and the gray value of the infrared light spot, thereby facilitating acquisition of the clear pupil and an image of the infrared light spot.

For example, when the gray value of the texture in the eye image which is stored in the processor of the control circuit 103 in advance is 108, the gray value of the preset light spot image is 100, or a scope of the gray value is stored in advance. When the eye tracking device performs the iris recognition, the processor in the control circuit 103 may determine whether the gray value of the received texture image achieves the preset gray value 108, or achieves the scope of the preset gray value. When the gray value of the received texture image achieves the preset gray value 108, or achieves the scope of the preset gray value, the brightness of the infrared light 1021 at the moment may not be adjusted. And when the gray value of the received texture image does not achieve the preset gray value 108, or does not achieve the scope of the preset gray value, the brightness of the infrared light 1021 may be adjusted by outputting at least one pulse width modulation signal.

When the eye tracking device performs the eye tracking, the processor in the control circuit 103 may determine whether the gray value of the image of the infrared light spot in the received eye image achieves the preset gray value 100, or achieves the scope of the preset gray value. When the gray value of the image of the infrared light spot in the received eye image achieves the preset gray value 100, or achieves the scope of the preset gray value, the brightness of the infrared light 1021 at the moment may not be adjusted. And when the gray value of the image of the infrared light spot in the received eye image does not achieve the preset gray value 100, or does not achieve the scope of the preset gray value, the brightness of the infrared light 1021 may be adjusted by outputting the pulse width modulation signal.

Pulse width modulation is an analog control mode which modulates a bias of a base of a transistor or a grid of a Metal Oxide Semiconductor (MOS) tube while implementing changes of an on-time of the transistor or the MOS tube according to changes of corresponding load. In this way, the output changes of stabilized switching power supply may be implemented. The mode may maintain an output voltage of the power supply constant when operating conditions are changed, and it is a very effective technology of controlling an analog circuit with at least one digital signal of a microprocessor.

Here, an output current may be adjusted by adjusting a duty ratio of the at least one pulse width modulation signal. Of course, adjustment of the brightness of the infrared light 1021 by outputting the at least one pulse width modulation signal is one embodiment, and it is not intended to limit to this mode.

In an alternative mode of implementation, the embodiment one of the present disclosure proposes that the infrared light group 102 includes at least one first infrared light and at least one second infrared light. And the number of the at least one first infrared light is less than the number of the at least one second infrared light.

The control circuit 103 is configured to control the at least one first infrared light to achieve the effective operating brightness and control the brightness of the at least one second infrared light be less than the threshold brightness when the eye tracking device performs the iris recognition, and further configured to control the brightness of the at least one first infrared light be less than the threshold brightness and control the at least one second infrared light to achieve the effective operating brightness when the eye tracking device performs the eye tracking.

In order to control the brightness of the infrared light to be less than the threshold brightness, the infrared light may be directly turned-off.

For example, the number of the at least one first infrared light is one, and the number of the at least one second infrared light is eight. When the eye tracking device performs the iris recognition, the at least one first infrared light is controlled by the control circuit 103, namely one infrared light achieves the effective operating brightness. When the eye tracking device performs the eye tracking, the at least one second infrared light is controlled by the control circuit 103, namely eight infrared lights achieve the effective operating brightness.

In an alternative mode of implementation, the embodiment one of the present disclosure proposes that the at least one first infrared light and at least one the second infrared light may be arranged in parallel, and each infrared light in the at least one second infrared light may be serially arranged.

In another alternative mode of implementation, the embodiment one of the present disclosure proposes that the control circuit 103 is electrically connected with all infrared lights 1021 in the infrared light group 102.

At the moment, the control circuit 103 is configured to control infrared lights 1021 with a first set number to achieve the effective operating brightness when the eye tracking device performs the iris recognition; and control infrared lights 1021 with a second set number to achieve the effective operating brightness when the eye tracking device performs the eye tracking. Herein, the first set number is less than the second set number.

For example, the first set number is one, and the second set number is eight. When the eye tracking device performs the iris recognition, the control circuit 103 is configured to control one infrared light 1021 in the infrared light group 102 to achieve the effective operating brightness. When the eye tracking device performs the eye tracking, the control circuit 103 is configured to control eight infrared lights 1021 in the infrared light group 102 to achieve the effective operating brightness. And the mentioned eight infrared lights 1021 may include one infrared light 1021 which is turned on during the mentioned iris recognition.

In an alternative mode of implementation, the embodiment one of the present disclosure proposes that all infrared lights 1021 in the infrared light group 102 are connected in parallel.

In an alternative mode of implementation, the embodiment one of the present disclosure proposes that the eye tracking device further includes an infrared light panel which is configured to bear the at least one infrared light 1021, and the control circuit 103 and the infrared camera 101 may be arranged on the infrared light panel.

Figure 2:
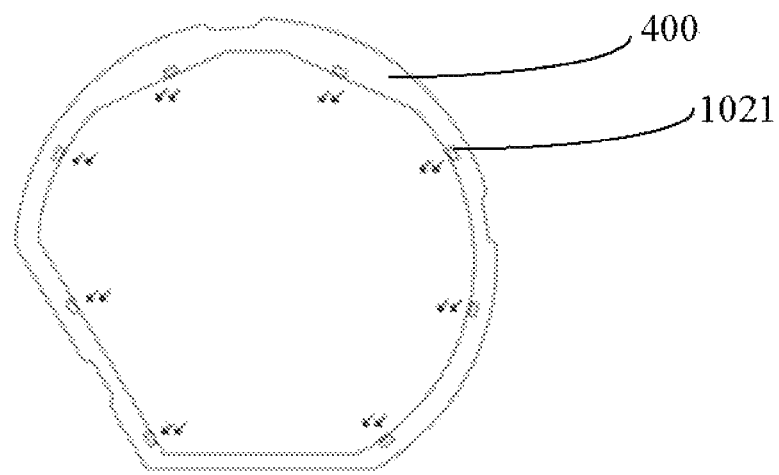
FIG. 2 shows a schematic diagram of a ring-shaped infrared light panel entity according to an embodiment of the present disclosure.
Figure 3:
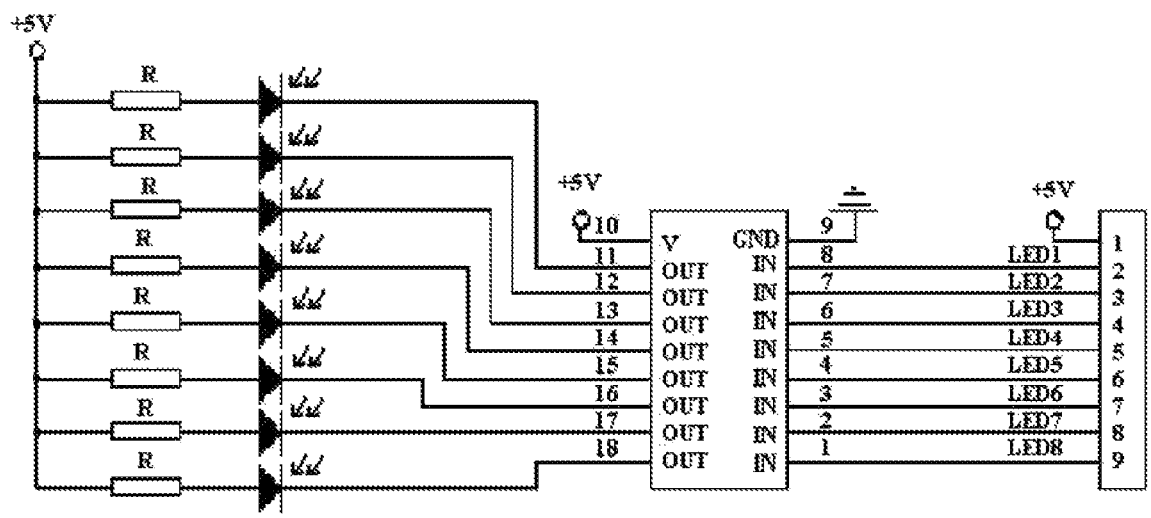
FIG. 3 shows a circuit diagram of a control circuit according to an embodiment of the present disclosure.

In an alternative mode of implementation, through the technical solution proposed in the embodiment one of the present disclosure, a ring-shaped infrared light panel 400 is taken, and on which all infrared lights 1021 are distributed uniformly. As shown in FIG. 2, an infrared light group 102 includes eight infrared lights 1021 totally. The eight infrared lights 1021 are distributed on the ring-shaped infrared light panel 400 uniformly, thereby forming a circle. The infrared lights are arranged at an equal interval, and the control circuit 103 is shown in FIG. 3 at the moment. As shown in FIG. 3, the eight infrared lights 1021 are connected with pins 11-18 of a chip in a one-to-one correspondence manner. Each infrared light 1021 is serially connected with a pull-up resistor R. The pins 11-18 of the chip output at least one level to control each infrared light 1021 which is connected correspondingly. The pins 1-8 of the chip receive control signals LED1-LED8 in a one-to-one correspondence manner, and each control signal controls the corresponding infrared light 1021.

The eye tracking device further includes a power supply component. The power supply component is configured to supply the power to the control circuit and the infrared camera.

In an alternative mode of implementation, through the technical solution proposed in the embodiment one of the present disclosure, the control circuit is further configured to control the infrared camera to start working when the at least one infrared light achieves the effective operating brightness.

In order to save power consumption of the power supply component, the control circuit 103 may further control an exposure time of the infrared camera 101, and a lighting-on time and a lighting-offtime of the infrared light 1021.

In an alternative mode of implementation, through the technical solution proposed in the embodiment one, when the eye tracking device works in an eye tracking mode, the exposure time of the infrared camera is set to a fixed maximum, and the control circuit adjusts the at least one infrared light that performs the eye tracking to the appropriate brightness by adjusting the at least one output pulse width modulation signal, to accordingly control the infrared camera to output at least one shooting synchronization signal. Upon completion of shooting, the eye tracking device controls the at least one infrared light which performs eye tracking to turn off. In this way, a flicker frequency of the at least one infrared light which performs the eye tracking is identical with a shooting frequency of the infrared camera.

When the eye tracking device performs the iris recognition, the control circuit adjusts the at least one infrared light which performs the iris recognition to the appropriate brightness by adjusting the output at least one pulse width modulation signal as well, to accordingly control the infrared camera to output the at least one shooting synchronization signal. Upon completion of shooting, the eye tracking device controls the at least one infrared light which performs the iris recognition to turn off. In this way, the flicker frequency of the at least one infrared light which performs the iris recognition is identical with the shooting frequency of the infrared camera.

In addition, in different present disclosure environments, the eye tracking device may select a different working mode. For example, the eye tracking device may start an iris recognition mode, or the eye tracking device may start an eye tracking mode, or the eye tracking device may start these two working modes.

For example, the eye tracking device should be configured as one environment having a high safety requirement, and may make the iris recognition mode start once every specified time interval. Moreover, the iris recognition function should be started alternately when the eye tracking device performs the eye tracking.

In an alternative mode of implementation, through the technical solution proposed in the embodiment I of the present disclosure, the control circuit controls to implement the eye tracking and the iris recognition alternately, and controls the infrared camera to shoot when the infrared light of corresponding mode is turned on alternately. In this way, a first frame image may be taken as the eye image under an eye-tracking mode, a second frame image may be taken as the eye image under an iris recognition mode, a third frame image may be taken as the eye image under the eye-tracking mode, . . . and so on, so that the eye-tracking mode and the iris recognition mode may be implemented at the same time. If a collection frequency is 60 fps, an eye image of a frame of odd number may be acquired from one working mode, and an eye image of a frame of even number may be acquired from another working mode. In this circumstance, human eyes may not feel switching of the infrared lights working under two working modes basically since these two working modes are switched rapidly.

Figure 4:
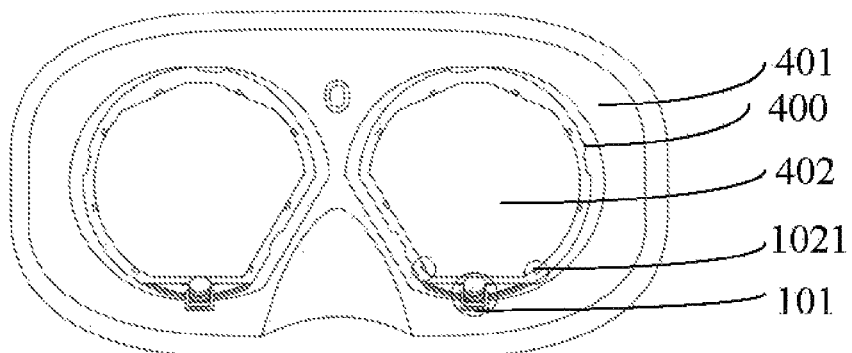
FIG. 4 shows a schematic diagram of a head-mounted virtual reality glasses entity according to an embodiment of the present disclosure.

In addition, the eye tracking device may be installed in a pair of virtual reality glasses. As shown in FIG. 4, the virtual reality glasses include a glasses frame 401. The glasses frame includes a lens 402 corresponding to each eye of the user. An internal diameter of a ring-shaped infrared light panel 400 is greater than a diameter of the lens 402, and the ring-shaped infrared light panel 400 is sleeved on the lens 402.

Embodiment Two

An embodiment two of the present disclosure provides a head-mounted display device. The head-mounted display device includes any one of the eye tracking devices in the embodiment one, and further includes a head-mounted display device body. The head-mounted display device body includes a bearing device. The bearing device includes a lens group and a display screen, and the lens group includes a left eye lens or a right eye lens.

The lens group may be a convex lens or a concave lens, or safety goggles, to adapt to requirements of different users. The display screen is configured to display at least one image.

The eye tracking device in the embodiment one is configured to perform user identify and confirm a direction of line-of-sight of the user. An infrared camera, an infrared light group and a control circuit in the eye tracking device may be installed on a ring-shaped infrared light panel. In order to save a design space of the head-mounted display device, the ring-shaped infrared light panel may be designed to have an internal diameter which is a little bit greater than a diameter of the left eye lens or the right eye lens in the lens group.

In an alternative mode of implementation, two ring-shaped infrared light panels are available and sleeved on the left eye lens and the right eye lens, respectively. The ring-shaped infrared light panel is uniformly provided with eight infrared lights and an infrared camera, and controlled by an identical control circuit.

The following will elaborate in detail in connection with one embodiment.

A pair of virtual reality glasses is equipped with the eye tracking device provided in the embodiment one, and the eye tracking device includes eight infrared lights, which are connected with the control circuit. The eight infrared lights are installed on the ring-shaped infrared light panel, and the control circuit is arranged on the ring-shaped infrared light panel as well. The ring-shaped infrared light panel is sleeved on a round eyepiece of the virtual reality glasses. The ring-shaped infrared light panel on which eight infrared lights are installed is sleeved on another round eyepiece of the virtual reality glasses. The eight infrared lights are controlled by the control circuit as well.

When wearing the virtual reality glasses, the user may switch on a switch of the virtual reality glasses first, and the eye tracking device may start confirming the user's identity. During this process, each infrared light in the two eyepieces may achieve effective operating brightness, and the infrared camera may collect an eye image of the user and send the eye image to a processor in the control circuit. An image gray value of iris recognition is set in the processor in advance. Upon receiving the eye image, the processor acquires the gray value of the eye image while comparing with the preset image gray value and adjusting the brightness of the infrared light in accordance with a comparison result. When the brightness is appropriate, the eye image acquired by the infrared camera may be processed, eye characteristic values of the user may be acquired and compared with characteristic values of a legal user which is stored in advance.

If the user is determined to be legal, the remaining seven lights may be controlled to be turned on completely, and the brightness of the eight lights may be adjusted to an appropriate scope at the same time. The image of the eye of the user is acquired in real time through the infrared camera, and a direction of line-of-sight of the user may be determined in accordance with locations of infrared light spots of the mentioned eight infrared lights through corneal reflection and a central location of a pupil of the user.

The above is a present disclosure environment of the eye tracking device, and the eye tracking device may further be applied to an augmented reality device and other head-mounted devices rather than limited to one pair of virtual reality glasses. For example, when withdrawing money or implementing other businesses at an automated teller machine (ATM), the user may control through one head-mounted device including the eye tracking device.

The above present disclosure environment is part of embodiments, and the equipment to which the eye tracking device mentioned in the embodiment one is applied shall fall within the scope of protection.

Based on the above analysis, and compared with the eye tracking device in the related art, the infrared light group includes at least two infrared lights which are arranged at different locations. The control circuit may respectively control the number of infrared lights that achieve the effective operating brightness in the infrared light group when the eye tracking device performs the iris recognition and the eye tracking. In this way, the numbers of the infrared lights achieving the effective operating brightness are different when the eye tracking device works under these two working states, and accordingly the eye tracking device may respectively control the numbers of the infrared lights that achieve the effective operating brightness in the infrared light group when performing the iris recognition and the eye tracking. Thus, fewer numbers of the infrared lights achieve the effective operating brightness when the eye tracking device performs the iris recognition and fewer infrared light spots appear on the user's eye image acquired by the infrared camera, and accordingly the user may be identified by acquiring the whole eye characteristics. Furthermore, many infrared lights achieve the effective operating brightness when the eye tracking device performs the eye tracking, and many infrared light spots appear on the user's eye image collected by the infrared camera, and accordingly the direction of the line-of-sight of the user may be acquired more accurately.

It is to be noted that similar labels and letters may represent the similar items in drawings below. Therefore once certain item is defined one drawing, it is not necessary to further define and explain in the subsequent drawings.

In the description of the embodiments of the present disclosure, it is to be noted that orientations or location relationships indicated by terms, such as "center", "up", "down", "left", "right", "vertical", "horizontal", "internal" and "external" are the ones based on the drawings, or the ones when a product according to the embodiments of the present disclosure is usually placed during using, and these orientations or location relationships are to facilitate description of the embodiments of the present disclosure and simplification of the description rather than to indicate or imply that the pointed device or element must have a specific orientation, and be constituted and operated with the specific orientation. Therefore, these orientations or location relationships should not be understood to limit the present disclosure. In addition, "first", "second", "third" and other terms are taken to differentiate the description rather than be understood to indicate or imply the relative importance.

In the description of the embodiments of the present disclosure, it is to be further noted that the terms including "arrange", "install", "connected" and "connect" should be understood broadly. For example, it may be fixed connection, or detachable connection, or integral connection, or mechanical connection, or electrical connection, or direct connection, or indirect connection through a medium or internal communication of two elements as well. Those of ordinary skill in the art may understand the specific meanings of the mentioned terms in the embodiments of the present disclosure in accordance with the specific conditions.

It is to be finally noted that each of the embodiments above is the alternative specific mode of implementation of the embodiments of the present disclosure and taken to describe the technical solutions in the embodiments of the present disclosure rather than limit the technical solutions. The scope of protection of the present disclosure is not limited to that. Although the mentioned embodiments are used for reference to describe the embodiments of the present disclosure in detail, those of ordinary skill in the art should understand that any of those skilled in the art may still make modifications or changes that may be easily thought of for the technical solutions recorded in the above-mentioned embodiments, or equivalent replacement for part of technical characteristics within the scope of technology disclosed in the embodiments of the present disclosure, and these modifications, changes or replacements should not separate essence of corresponding technical solutions from the spirits and scope of the technical solutions in the embodiments of the present disclosure, and should fall within the scope of protection of the present disclosure. Therefore, the scope of protection of claims shall prevail in terms of the scope of protection of the present disclosure.

INDUSTRIAL APPLICABILITY

From the above description, embodiments of the present disclosure provide an eye tracking device and a head-mounted display device. The eye tracking device includes at least on infrared camera, at least on infrared light group and a control circuit. The control circuit is electrically connected with the at least on infrared light group. Each of the at least one infrared light group includes at least two infrared lights which are arranged at different locations. Each of the at least one infrared camera is configured to collect an eye image of a user when the at least one infrared light is turned on. The control circuit is configured to respectively control the number of infrared lights that achieve effective operating brightness in each infrared light group when the eye tracking device performs iris recognition and eye tracking, and the effective operating brightness refers that the brightness is not less than a threshold brightness. The embodiments of the present disclosure solve the technical problem that a direction of line-of-sight of the user may not be acquired accurately in the related art. In this way, the eye tracking device may rapidly identify the user when performing the iris recognition and acquire a direction of line-of-sight of the user more accurately when performing the eye tracking.

What is claimed is:

1. An eye tracking device, comprising: at least one infrared camera, at least one infrared light group and a control circuit; wherein the control circuit is electrically connected with the at least one infrared light group, each of the at least one infrared light group comprises at least two infrared lights which are arranged at different locations;

each of the at least one infrared camera is configured to collect an eye image of a user when the at least two infrared lights are turned on;

the control circuit is configured to respectively control the number of infrared lights that achieve effective operating brightness in each infrared light group when the eye tracking device performs iris recognition and eye tracking, and the effective operating brightness refers that a brightness is not less than a threshold brightness;

wherein the at least one infrared light group comprises an infrared light group which is arranged at a first location and an infrared light group which is arranged at a second location, infrared light which is emitted when the infrared light group arranged at the first location works may not directly irradiate an eye of the user, and infrared light which is emitted when the infrared light group arranged at the second location works may directly irradiate the eye of the user; and the control circuit is further configured to control the infrared light group which is arranged at the first location to achieve the effective operating brightness when the eye tracking device performs the iris recognition, and control the infrared light group which is arranged at the second location to achieve the effective operating brightness when the eye tracking device performs the eye tracking;

wherein the infrared light group at the first location comprises at least two infrared lights, and the infrared light group at the second location comprises at least three infrared lights; a light-emitting wavelength of each infrared light in the infrared light group at the first location is less than a light-emitting wavelength of any infrared light in the infrared light group at the second location.

2. The eye tracking device as claimed in claim 1, wherein each of the at least one infrared camera is electrically connected with the control circuit;

each of the at least one infrared camera is further configured to transmit the eye image and an iris image which is formed when infrared light irradiates this infrared camera to the control circuit; and the control circuit is further configured to adjust the brightness of the infrared lights that achieves the effective operating brightness, so as to make a gray value of the eye image achieve a preset gray value.

3. The eye tracking device as claimed in claim 1, wherein each infrared light group comprises at least one first infrared light and at least one second infrared light, and the number of the at least one first infrared light is less than the number of the at least one second infrared light;

the control circuit is further configured to control the at least one first infrared light to achieve the effective operating brightness and control the brightness of the at least one second infrared light to be less than the threshold brightness when the eye tracking device performs the iris recognition, and further configured to control the brightness of the at least one first infrared light to be less than the threshold brightness and control the at least one second infrared light to achieve the effective operating brightness when the eye tracking device performs the eye tracking.

4. The eye tracking device as claimed in claim 1, wherein light-emitting wavelengths of at least two infrared lights in the infrared light group at the first location are different.

5. The eye tracking device as claimed in claim 4, wherein the at least one infrared camera comprises a first infrared camera and a second infrared camera, the control circuit is further configured to control the first infrared camera to work when the eye tracking device performs the iris recognition; and control the second infrared camera to work when the eye tracking device performs the eye tracking.

6. The eye tracking device as claimed in claim 1, wherein the control circuit is further configured to control the at least one infrared camera to start working when the infrared lights achieve the effective operating brightness.

7. A head-mounted display device, comprising the eye tracking device as claimed in claim 1.

8. A head-mounted display device, comprising the eye tracking device as claimed in claim 2.

9. A head-mounted display device, comprising the eye tracking device as claimed in claim 3.

10. A head-mounted display device, comprising the eye tracking device as claimed in claim 4.

11. A head-mounted display device, comprising the eye tracking device as claimed in claim 5.

12. A head-mounted display device, comprising the eye tracking device as claimed in claim 6.

13. The head-mounted display device as claimed in claim 7, wherein the device further comprises: a head-mounted display device body, wherein the head-mounted display device body comprises a bearing device and the bearing device comprises a lens group and a display screen, and the lens group comprises a left eye lens or a right eye lens.

* * * * *